United States Patent
Su et al.

(10) Patent No.: US 9,111,344 B2
(45) Date of Patent: Aug. 18, 2015

(54) IMAGE PROCESSING METHOD AND IMAGE PROCESSING DEVICE THEREOF FOR IMAGE ALIGNMENT

(71) Applicants: Pin-Ching Su, Kaohsiung (TW); Hwann-Tzong Chen, Taipei (TW); Ming-Feng Chiang, Miaoli County (TW)

(72) Inventors: Pin-Ching Su, Kaohsiung (TW); Hwann-Tzong Chen, Taipei (TW); Ming-Feng Chiang, Miaoli County (TW)

(73) Assignees: NOVATEK Microelectronics Corp., Hsinchu Science Park, Hsin-Chu (TW); Tsing Hua University, Hsin-Chu (TW)

( * ) Notice: Subject to any disclaimer, the term of this patent is extended or adjusted under 35 U.S.C. 154(b) by 309 days.

(21) Appl. No.: 13/918,991

(22) Filed: Jun. 17, 2013

(65) Prior Publication Data
US 2014/0193098 A1    Jul. 10, 2014

(30) Foreign Application Priority Data
Jan. 9, 2013 (TW) .............................. 102100725 A

(51) Int. Cl.
G06T 7/00 (2006.01)
(52) U.S. Cl.
CPC ..... *G06T 7/0034* (2013.01); *G06T 2207/20208* (2013.01)
(58) Field of Classification Search
USPC ................................. 382/294, 237
See application file for complete search history.

(56) References Cited

U.S. PATENT DOCUMENTS

| | | | | |
|---|---|---|---|---|
| 5,164,997 A * | 11/1992 | Kumagai | ...................... | 382/294 |
| 7,953,287 B2 | 5/2011 | Drimbarean | | |
| 8,427,504 B2 * | 4/2013 | Witt et al. | ..................... | 345/629 |
| 8,526,762 B2 * | 9/2013 | Cooper | ........................ | 382/294 |
| 2006/0153447 A1 * | 7/2006 | Ouchi | ........................... | 382/173 |
| 2012/0082372 A1 * | 4/2012 | Mittal et al. | ................. | 382/159 |
| 2012/0206617 A1 | 8/2012 | Albu | | |
| 2012/0314974 A1 * | 12/2012 | Yang | ............................ | 382/294 |

FOREIGN PATENT DOCUMENTS

| | | |
|---|---|---|
| TW | 201028932 | 8/2010 |
| TW | 201117134 | 5/2011 |

OTHER PUBLICATIONS

Wang et al., Superpixel Tracking, 2011 IEEE International Conference on Computer Vision 978-1-4577-1102-2/11, 2011.
Chi et al., A Direct Method for Estimating Planar Projective Transform, 2010.
Liu et al., SIFT Flow: Dense Correspondence across Different Scenes, ECCV, part III, LNCS 5304, pp. 28-42 ,2008.

\* cited by examiner

*Primary Examiner* — Ishrat I Sherali
(74) *Attorney, Agent, or Firm* — Winston Hsu; Scott Margo

(57) ABSTRACT

An image processing method for image alignment, includes sequentially receiving a plurality of images; generating at least one threshold corresponding to each image according to a plurality of intensities of each image of the plurality of images; converting each image according to the thresholds of each image, for generating a plurality of binary images; acquiring a plurality of characteristic pixels of each binary image according to the plurality of binary images; and aligning the plurality of images according to the plurality of characteristic pixels of each binary image.

20 Claims, 5 Drawing Sheets

IMAGE PROCESSING METHOD AND IMAGE PROCESSING DEVICE THEREOF FOR IMAGE ALIGNMENT

BACKGROUND OF THE INVENTION

1. Field of the Invention

The present invention relates to an image processing method and image processing device thereof for image alignment, and more particularly, to an image processing method and image processing device thereof capable of aligning images sequentially captured.

2. Description of the Prior Art

Mobile devices, such as digital camera, PDA and mobile phone, are commonly used in daily life. The functions of the module devices become more and more diversified. For example, the PDA or the mobile phone is usually equipped with a digital camera for capturing images. Since the intensity range of an image which is captured in single shot is limited, parts of the image may be underexposed or overexposed when the digital camera captures the image with an extensive intensity range.

In the prior art, the high dynamic range (HDR) image technology is utilized to extend limited intensity range. The high dynamic range image technology sequentially captures images with different intensity ranges and combines the captured images according to appropriate coefficients, so as to acquire a high quality image. However, if the image capture device (i.e. digital camera) is not equipped with tripod while sequentially capturing the images with different intensity ranges, there would be slight shifts between the images. In such a condition, the detail of the combined image would become fuzzy and the quality of image would be decreased. Thus, the images need to be aligned before combining the images sequentially captured.

The most common method of correcting the displacements between the images sequentially captured is scale-invariant feature transform (SIFT). Please refer to FIG. 1, which is a schematic diagram of the scale-invariant feature transform. The basic concept of the scale-invariant feature transform is searching characteristic pixels under different Gaussian blur levels. The characteristic pixels are the pixel with the maximum difference of Gaussian within a part of the image. When a first characteristic pixel not only has the maximum difference of Gaussian in the octave thereof but also has the maximum difference of Gaussian in the upper octave and the lower octave, the first characteristic pixel is sufficiently representative. Via comparing the representative characteristic pixels of the images sequentially captured, the images can be correctly aligned. The accuracy of the scale-invariant feature transform is considerably high. However, the steps of building multi-layers of Gaussian blur for searching the characteristic pixels are time-consuming. As can be seen from the above, the prior art is needed to be improved.

SUMMARY OF THE INVENTION

Therefore, the present invention provides an image processing method and image processing device thereof capable of efficiently acquiring representative characteristic pixels in images sequentially captured, for correcting displacements between the images.

The present invention discloses an image processing method for image alignment. The image processing method comprises sequentially receiving a plurality of images; generating at least one threshold corresponding to each image according to a plurality of intensities of each image of the plurality of images; converting each image according to the thresholds of each image, for generating a plurality of binary images; acquiring a plurality of characteristic pixels of each binary image according to the plurality of binary images; and aligning the plurality of images according to the plurality of characteristic pixels of each binary image.

The present invention further discloses an image processing device for image alignment. The image processing device comprises a processing unit; and a storage unit for storing a program code, the program code instructs the processing unit to perform the following steps: sequentially receiving a plurality of images; generating at least one threshold corresponding to each image according to a plurality of intensities of each image of the plurality of images; converting each image according to the thresholds of each image, for generating a plurality of binary images; acquiring a plurality of characteristic pixels of each binary image according to the plurality of binary images; and aligning the plurality of images according to the plurality of characteristic pixels of each binary image.

These and other objectives of the present invention will no doubt become obvious to those of ordinary skill in the art after reading the following detailed description of the preferred embodiment that is illustrated in the various figures and drawings.

DETAILED DESCRIPTION

In embodiments of the present invention, an image processing method for image alignment and image processing device thereof simplify the operation procedures of searching characteristic pixels in each image via mapping the images to binary space are disclosed. Through acquiring the relative positions between the characteristic pixels corresponding to the same image feature in each image, the image processing method and image processing device thereof disclosed in the present invention can efficiently and accurately align the images. The present invention is particularly shown and described with respect to at least one exemplary embodiment accompanied with drawings. Words utilized for describing connection between two components such as couple and connect should not be taken as limiting a connection between the two components to be directly coupling or indirectly coupling.

Figure 1:
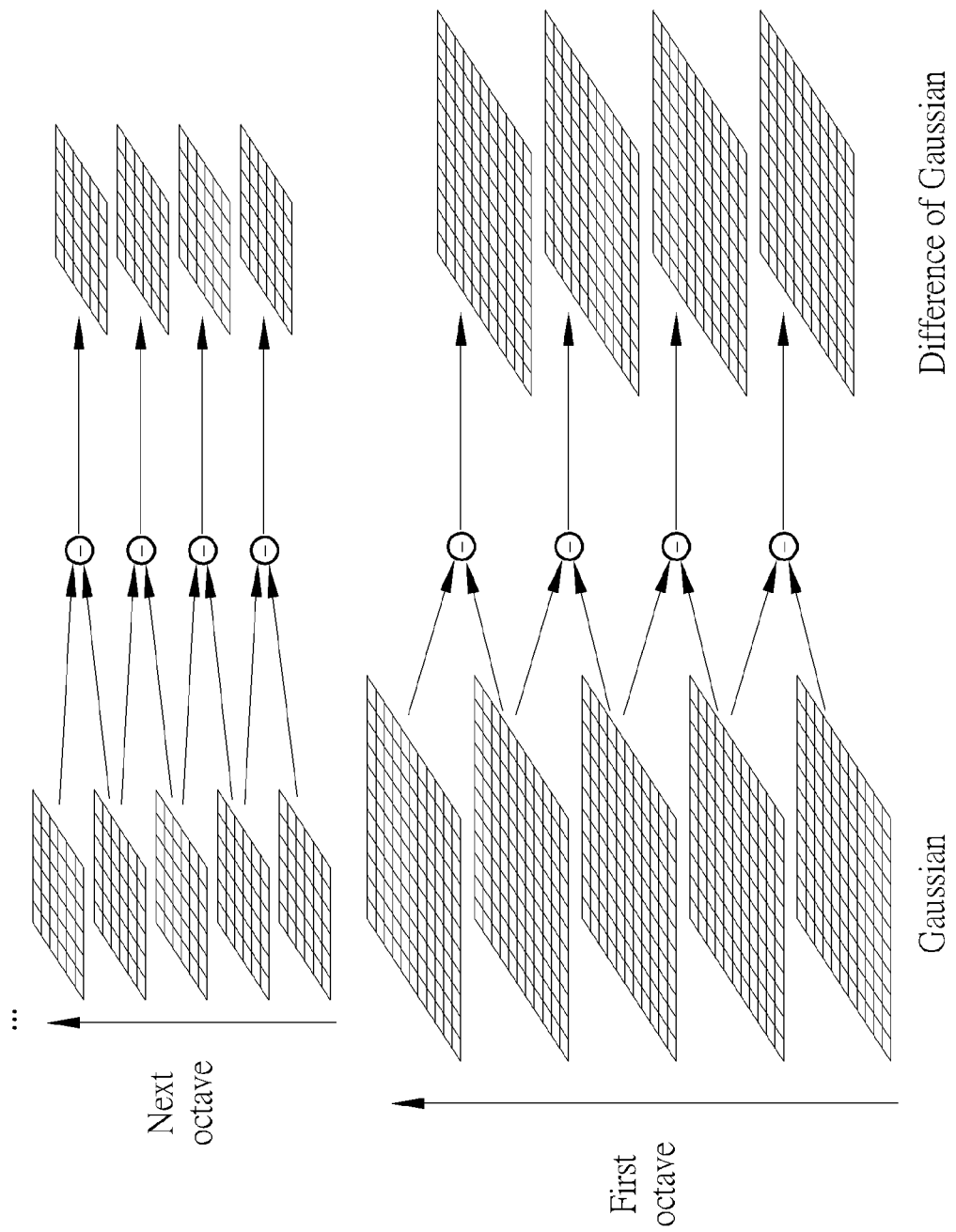
FIG. 1 is a schematic diagram of conventional scale-invariant feature transform.
Figure 2:
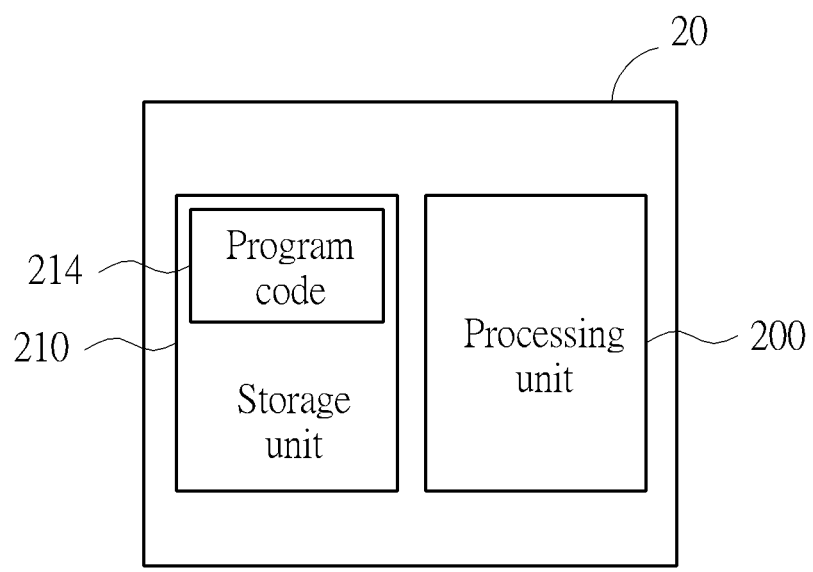
FIG. 2 is a schematic diagram of an image processing device according to an embodiment of the present invention.

Please refer to FIG. 2, which is a schematic diagram of an image processing device 20 according to an embodiment of the present invention. The image processing device 20 can be utilized in a multi-media image system, but is not limited herein. The image processing device 20 includes a processing unit 200 such as a microprocessor or an Application Specific Integrated Circuit (ASIC) and a storage unit 210. The storage unit 210 may be any data storage device that can store a program code 214, accessed by the processing unit 200. Examples of the storage unit 210 include, but are not limited to, a subscriber identity module (SIM), read-only memory (ROM), flash memory, random-access memory (RAM), CD-ROM/DVD-ROM, magnetic tape, hard disk, and optical data storage device.

Figure 3:
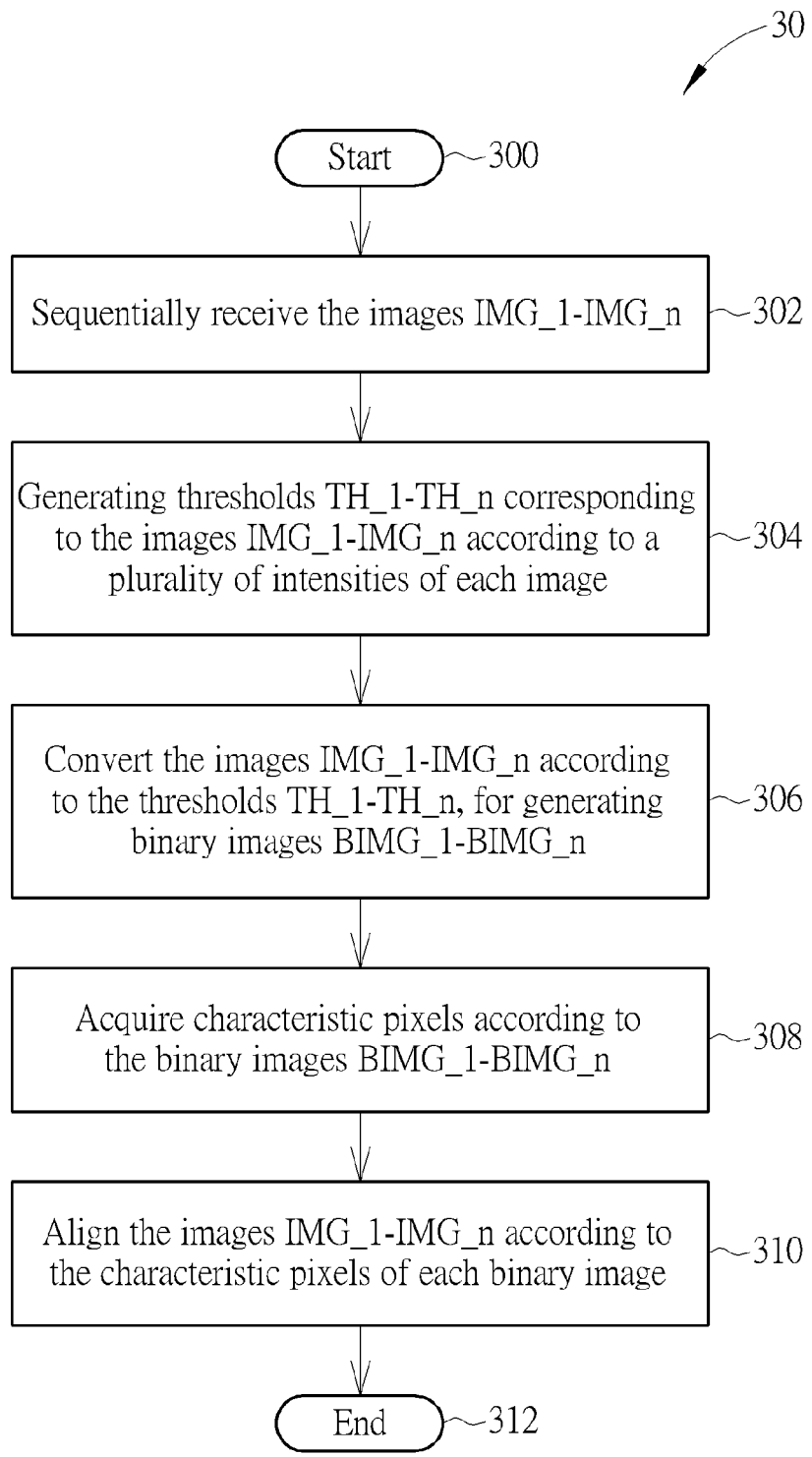
FIG. 3 is a flow diagram of an image processing method of according to an embodiment of the present invention.

Please refer to FIG. 3, which is a flow diagram of an image processing method 30 according to an embodiment of the present invention. The image processing method 30 is utilized for aligning images IMG_1-IMG_n and can be compiled into the program code 214 shown in FIG. 2. The image processing method 30 comprises the following steps:

Step 300: Start.

Step 302: Sequentially receive the images IMG_1-IMG_n.

Step 304: Generating thresholds TH_1-TH_n corresponding to the images IMG_1-IMG_n according to a plurality of intensities of each image.

Step 306: Convert the images IMG_1-IMG_n according to the thresholds TH_1-TH_n, for generating binary images BIMG_1-BIMG_n.

Step 308: Acquire characteristic pixels according to the binary images BIMG_1-BIMG_n.

Step 310: Align the images IMG_1-IMG_n according to the characteristic pixels of each binary image.

Step 312: End.

According to the image processing method 30, the image processing device 20 maps the images IMG_1-IMG_n, which is sequentially captured, to the binary space for simplifying the process of acquiring the characteristic pixels, so as to efficiently align the images IMG_1-IMG_n.

As to the details of the image processing method 30 please refer to the following. After the image processing device 20 sequentially receives the images IMG_1-IMG_n, the image processing device 20 generates the thresholds TH_1-TH_n according to the intensity of each pixel in the images IMG_1-IMG_n. Please note that, the images IMG_1-IMG_n are sequentially captured and have different intensity ranges, but are not limited herein. For example, the image IMG_1-IMG_n may be images sequentially captured toward the same scene. Or, the image IMG_1-IMG_n may be images sequentially captured toward the same scene with different intensity ranges. In this embodiment, the threshold TH_1 is a median of intensities of all pixels in the image IMG_1, the threshold TH_2 is a median of intensities of all pixels in the image IMG_2, and so on (steps 302, 304). The image processing device 20 then converts the images IMG_1-IMG_n according to the thresholds TH_1-TH_n, for generating the binary images BIMG_1-BIMG_n corresponding to the images IMG_1-IMG_n. For example, when the intensity of a pixel in the image IMG_1 is greater than or equal to the threshold TH_1, the image processing device 20 defines a pixel of the binary image BIMG_1 corresponding to the pixel of the image IMG_1 as "1"; and when the intensity of a pixel in the image IMG_1 is smaller than the threshold TH_1, the image processing device 20 defines a pixel of the binary image BIMG_1 corresponding to the pixel of the image IMG_1 as "0". The formula of the image processing device 20 convert the image IMG1 to the binary image BIMG_1 can be represented as:

$$BIMG\_1(x,y) = 1, IMG(x,y) \geq TH1; \quad 0, IMG(x,y) < TH1 \quad (1)$$

In other words, the image IMG_1 becomes the binary image BIMG_1 when the image IMG_1 is mapped to the binary space. According to formulas similar to the formula (1), the image processing device 20 coverts the images IMG_2-IMG_n to the binary images BIMG_2-BIMG_n, separately. Please note that, since the thresholds TH_1-TH_n are the medians of intensities in the images IMG_1-IMG_n, the binary images BIMG_1-BIMG_n are highly similar to each other even the images IMG_1-IMG_n have different intensity ranges.

Next, the image processing device 20 searches the representative characteristic pixels in the binary images BIMG_1-BIMG_n, for aligning the images IMG_1-IMG_n. In this embodiment, the image processing device 20 first divides the binary images BIMG_1-BIMG_n to generate pixel areas corresponding to each pixels in the binary images BIMG_1-BIMG_n, and then determines whether a pixel is the representative characteristic pixel according to the gradient of the pixel area thereof. The pixel area is a K×K block, and is not limited herein. When the gradient of the pixel area exceeds a certain value, the image processing device 20 determines the pixel corresponding to the pixel area is the characteristic pixel; otherwise, the image processing device 20 determines the pixel corresponding to the pixel area is not representative.

Figure 4:
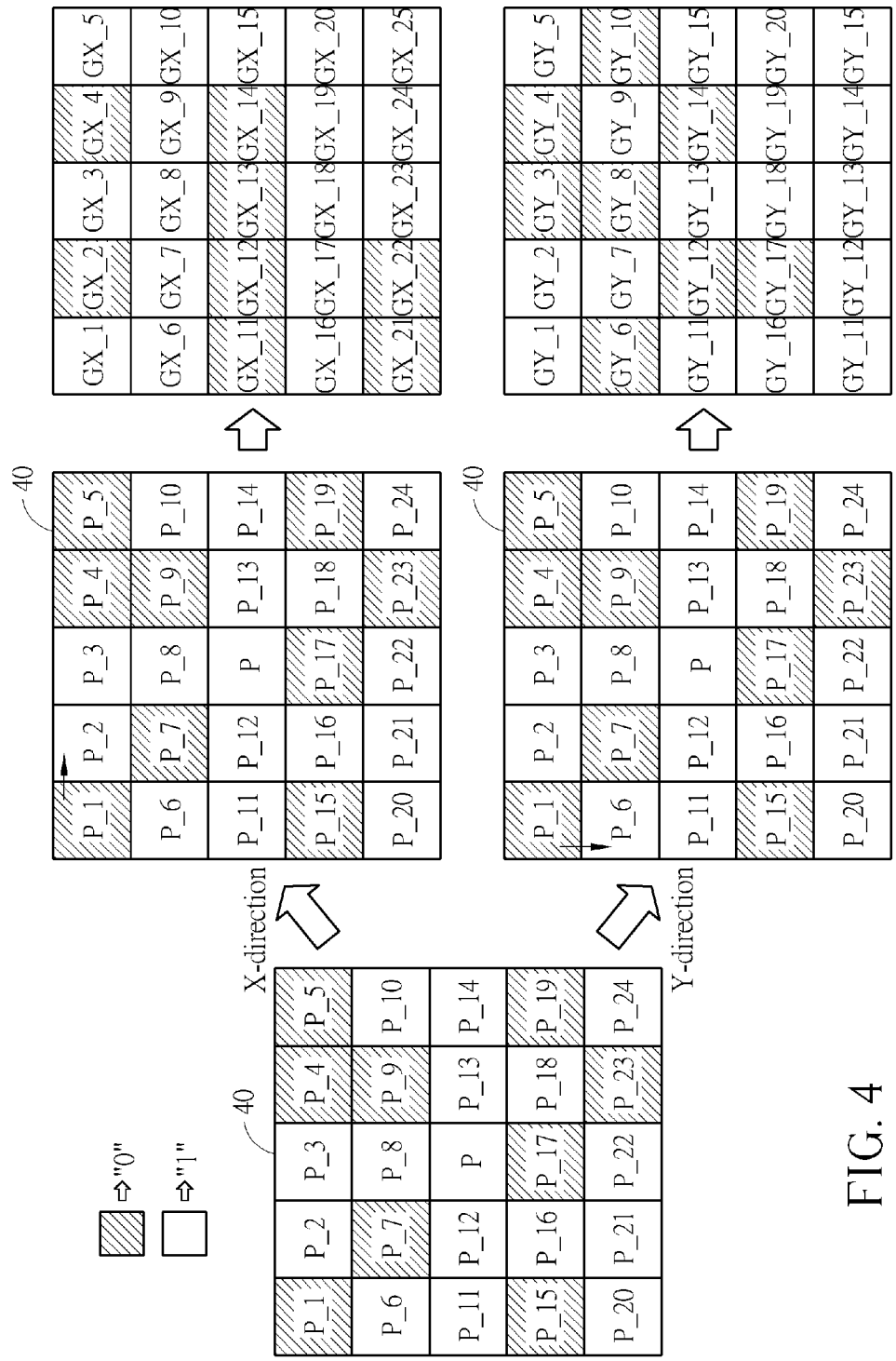
FIG. 4 is a schematic diagram of a pixel area according to an embodiment of the present invention.

Please refer to FIG. 4, which is a schematic diagram of a pixel area 40 according to an embodiment of the present invention. As shown in FIG. 4, the pixel area 40 is a 5×5 block corresponding to a pixel P. The pixel area 40 comprises the pixel P and pixel P_1-P_24. For acquiring the gradient of the pixel area 40, the image processing device 20 calculates absolute difference between the pixel value of the pixel P_1 and that of the pixel P_2, for acquiring horizontal gradient GX_1 of the pixel P_1 (i.e. $GX\_1 = abs(P\_1 - P\_2)$). When the pixel P_1 is different from the pixel P_2, the gradient GX_1 is "1"; otherwise, the gradient GX_1 is "0". Next, The image processing device 20 calculates absolute difference between the pixel value of the pixel P_2 and that of the pixel P_3, for acquiring horizontal gradient GX_2 of the pixel P_2 (i.e. $GX\_1 = abs(P\_2 - P\_3)$), and so on. As a result, the image processing device 20 acquires the gradients GX_1-GX_25 of the X-direction (i.e. horizontal direction) in the pixel area 40. Similarly, the image processing device 20 acquires a vertical gradient GY_2 by calculating absolute difference between the pixel P_1 and the pixel P_6 (i.e. $GY\_2 = abs(P\_1 - P\_6)$). When the pixel P_1 is different from the pixel P_6, the gradient GX_1 is "1"; otherwise, the gradient GX_1 is "0". The image processing device 20 then acquires a vertical gradient GY_2 by calculating absolute difference between the pixel P_2 and the pixel P_7 (i.e. $GY\_2 = abs(P\_2 - P\_7)$), and so on. As a result, the image processing device 20 acquires the gradients GY_2-GY_25 of the Y-direction (i.e. vertical direction) in the pixel area 40.

After acquiring the gradients GX_1-GX_25, GY_2-GY_25 in the pixel area 40, the image processing device 20 acquires the pixel area difference of the pixel area 40 via counting the number of "1" in the gradient GX_1-GX_25, GY_1-GY_25. In other words, the pixel area difference of the pixel area 40 is proportional to the difference levels between each pixel and the adjacent pixel thereof. When the pixel area difference of the pixel 40 exceeds a characteristic threshold, the pixel area 40 is highly unique. The image processing device 20 determines the pixel P is the characteristic pixel. Via repeating the above procedures, the image processing device 20 acquires positions of all the representative characteristic pixels and the pixel areas of the characteristic pixels (step 308). Please note that, the pixel areas of the characteristic pixels are highly unique means that the pixel areas of the characteristic pixels are highly identifiable. The pixel areas of the characteristic pixels can be utilized for representing the characteristic pixels. Besides, since the binary images BIMG_1-BIMG_n are in the binary space, the image processing device 20 can use a simple comparing algorithm for comparing the pixel areas of the characteristic pixels of the binary images BIMG_1-BIMG_n.

Since the binary images BIMG_1-BIMG_n are highly similarly to each other, the binary images BIMG_1-BIMG_n comprise the characteristic pixels with the same pixel area. Based on that the pixel areas of the characteristic pixels are highly unique, the characteristic pixels with the same pixel area are corresponding to the same image feature in the images IMG_1-IMG_n. Thus, via comparing the pixel areas of the characteristic pixels in the binary images BIMG_1-BIMG_n, the image processing device 20 acquires relative positions of the characteristic pixels with the same pixel area in the binary images BIMG_1-BIMG_n (i.e. the relative positions between the pixels corresponding to the same image characteristic in the images IMG_1-IMG_n). In this embodiment, since the binary images BIMG_1-BIMG_n have been mapped to the binary space, the image processing device 20 can easily use Hamming distance for acquiring relationships between the characteristic pixels of the binary images BIMG_1-BIMG_n. Please note that, the characteristic pixels represent local uniqueness of the binary images BIMG_1-BIMG_n, the processing device 20 needs to consider space relationships between the characteristic pixels when comparing the characteristic pixels. For example, since the images IMG_1-IMG_n may be images sequentially captured according to different intensity ranges towards the same scene, the corresponding characteristic pixels between the binary images BIMG_1-BIMG_n need to be close.

After acquiring the corresponding relationships between characteristic pixels of the binary images BIMG_1-BIMG_n, the image processing device 20 can utilize a random sample consensus (RANSAC) algorithm to calculate relationships between each pixel of the binary images BIMG_1-BIMG_n. The image processing device 20 then aligns the images IMG_1-IMG_n according to the relationships between each pixel of the binary images BIMG_1-BIMG_n (step 310). The Hamming distance and the random sample consensus algorithm should be well known to those skilled in the art, and are not narrated herein for brevity.

Noticeably, the above embodiments map images sequentially captured to the binary space for acquiring the corresponding characteristic pixels between the images via simple calculations, so as to efficiently align the images sequentially captured. According to different applications, those skilled in the art may accordingly observe appropriate alternations and modifications. For example, the thresholds TH_1-TH_n can be changed to other statistics, such as a lower quartile, a higher quartile and a mean, of the intensities in the images IMG_1-IMG_n, but are not limited herein.

Figure 5:
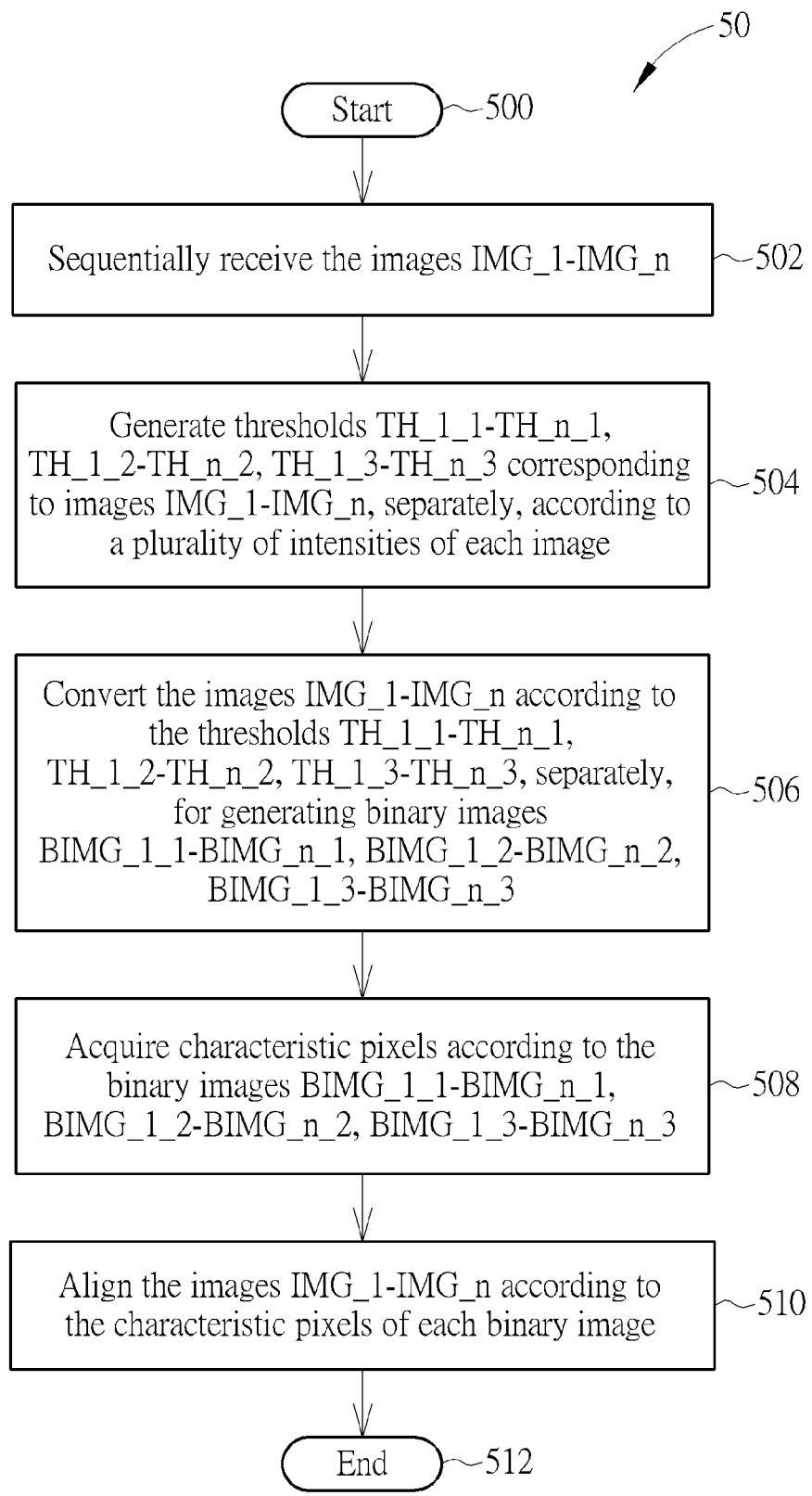
FIG. 5 is a schematic diagram of another image processing method according to an embodiment of the present invention.

The image processing device 20 also can use multiple thresholds defined in different methods (ex. median, lower quartile, higher quartile and mean) in single operation, for acquiring more characteristic pixels and increasing accuracy of aligning. For example, please refer to FIG. 5, which is a flow diagram of an image processing method 50 according to an embodiment of the present invention. The image processing method 50 can be utilized for aligning the images IMG_1-IMG_n and can be compiled into the program code 214 shown in FIG. 2. The image processing method 50 comprises the following steps:

Step 500: Start.

Step 502: Sequentially receive the images IMG_1-IMG_n.

Step 504: Generate thresholds TH_1_1-TH_n_1, TH_1_2-TH_n_2, TH_1_3-TH_n_3 corresponding to images IMG_1-IMG_n, separately, according to a plurality of intensities of each image.

Step 506: Convert the images IMG_1-IMG_n according to the thresholds TH_1_1-TH_n_1, TH_1_2-TH_n_2, TH_1_3-TH_n_3, separately, for generating binary images BIMG_1_1-BIMG_n_1, BIMG_1_2-BIMG_n_2, BIMG_1_3-BIMG_n_3.

Step 508: Acquire characteristic pixels according to the binary images BIMG_1_1-BIMG_n_1, BIMG_1_2-BIMG_n_2, BIMG_1_3-BIMG_n_3.

Step 510: Align the images IMG_1-IMG_n according to the characteristic pixels of each binary image.

Step 512: End.

According to the image processing method 50, the image processing device 20 can simplified the operations of acquiring the corresponding characteristic pixels between the images IMG_1-IMG_n, so as to efficiently align the images IMG_1-IMG_n. In the image processing method 50, the thresholds TH_1_1-TH_n_1 are medians of pixel intensities of the images IMG_1-IMG_n, separately. The thresholds TH_1_2-TH_n_2 are lower quartiles of the pixel intensities of the images IMG_1-IMG_n, separately. The thresholds TH_1_3-TH_n_3 are higher quartiles of the pixel intensities of the images IMG_1-IMG_n, separately. Since the image processing method 30 shown in FIG. 3 only uses the median of pixel intensities in the images IMG_1-IMG_n as the threshold for generating the binary images BIMG_1-BIMG_n, the high intensity areas or the low intensity areas in the binary images BIMG_1-BIMG_n are highly similar to each other (i.e. all the values of the high intensity areas may be "1" and all the values of the low intensity areas may be "0"). In such a condition, the high intensity area and the low intensity area comprise zero characteristic pixels. In comparison, the image processing method 50 further utilizes the thresholds TH_1_2-TH_n_2, which are smaller than the thresholds TH_1_1-TH_n_1, for generating the binary images BIMG_1_2-BIMG_n_2. The image processing device 20 therefore can acquire characteristic pixels in the low intensity area according to the binary images BIMG_1_2-BIMG_n_2. Similarly, the image processing method 50 utilizes the thresholds TH_1_3-TH_n_3, which are greater than the thresholds TH_1_1-TH_n_1, for generating the binary images BIMG_1_3-BIMG_n_3. The image processing device 20 therefore can acquire characteristic pixels in the high intensity area. In comparison with image processing method 30, the image processing method 50 utilizes thresholds defined indifferent methods to acquire the number of the characteristic pixels, so as to increase accuracy of aligning the images IMG_1-IMG_n. The detailed operation procedures of the image processing method 50 can be referred to the above, and are not narrated herein for brevity.

Please note that, the abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits such as microcircuits, microchips, or silicon chips. Examples of the electronic system can include system on chip (SOC), system in package (Sip), computer on module (COM), and the image processing device 20.

To sum up, the image processing methods and image processing device thereof disclosed in the above embodiments simplify the calculation procedures of acquiring the characteristic pixels via mapping the images sequentially captured into the binary space, so as to efficiently align the images. Moreover, the accuracy of aligning the images can be effectively increased via adopting multiple thresholds generated by different methods.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing method for image alignment, comprising:
   sequentially receiving a plurality of images;
   generating at least one threshold corresponding to each image according to a plurality of intensities of each image of the plurality of images;
   converting each image according to the thresholds of each image, for generating a plurality of binary images;
   acquiring a plurality of characteristic pixels of each binary image according to the plurality of binary images; and
   aligning the plurality of images according to the plurality of characteristic pixels of each binary image.

2. The image processing method of claim 1, wherein each image comprises different intensity ranges.

3. The image processing method of claim 1, wherein the thresholds of each image comprises a median of the intensities of each image.

4. The image processing method of claim 1, wherein the thresholds of each image comprises a lower quartile of the intensities of each image.

5. The image processing method of claim 1, wherein the thresholds of each image comprises a higher quartile of the intensities of each image.

6. The image processing method of claim 1, wherein the step of acquiring the plurality of characteristic pixels of each binary image according to the plurality of binary images comprises:
   generating a plurality of pixel areas, each pixel area corresponds to each pixel of each binary image;
   acquiring a pixel area difference of each pixel area according to differences between pixels of each pixel area; and
   determining the plurality of characteristic pixels of each binary image according to the pixel area difference of each pixel area and a characteristic threshold.

7. The image processing method of claim 6, wherein the step of acquiring the pixel area difference of each pixel area according to the differences between pixels of each pixel area comprises:
   increasing the pixel area difference of a first pixel area when the first pixel of the first pixel area is different from a first horizontal pixel horizontally adjacent to the first pixel.

8. The image processing method of claim 6, wherein the step of acquiring the pixel area difference of each pixel area according to the differences between pixels of each pixel area comprises:
   increasing the pixel area difference of a first pixel area when a first pixel of the first pixel area is different from a first vertical pixel vertically adjacent to the first pixel.

9. The image processing method of claim 6, wherein the step of determining the plurality of characteristic pixels of each binary image according to the pixel area difference of each pixel area and the characteristic threshold comprises:
   determining a first pixel corresponding to a first pixel area is one of the plurality of characteristic pixels of each binary image when the pixel difference of the first pixel area exceeds the characteristic threshold.

10. The image processing method of claim 6, wherein the step of aligning the plurality of images according to the plurality of the characteristic pixels of each binary image comprises:
    aligning the plurality of images according to the plurality of pixel areas corresponding to the plurality of characteristic pixels.

11. An image processing device for aligning images, comprising:
    a processing unit; and
    a storage unit for storing a program code, the program code instructs the processing unit to perform the following steps:
    sequentially receiving a plurality of images;
    generating at least one threshold corresponding to each image according to a plurality of intensities of each image of the plurality of images;
    converting each image according to the thresholds of each image, for generating a plurality of binary images;
    acquiring a plurality of characteristic pixels of each binary image according to the plurality of binary images; and
    aligning the plurality of images according to the plurality of characteristic pixels of each binary image.

12. The image processing device of claim 11, wherein each image comprises different intensity ranges.

13. The image processing device of claim 11, wherein the thresholds of each image comprises a median of the intensities of each image.

14. The image processing device of claim 11, wherein the thresholds of each image comprises a lower quartile of the intensities of each image.

15. The image processing device of claim 11, wherein the thresholds of each image comprises a higher quartile of the intensities of each image.

16. The image processing device of claim 11, wherein the step of acquiring the plurality of characteristic pixels of each binary image according to the plurality of binary images comprises:
    generating a plurality of pixel areas, each pixel area corresponds to each pixel of each binary image;
    acquiring a pixel area difference of each pixel area according to differences between pixels of each pixel area; and
    determining the plurality of characteristic pixels of each binary image according to the pixel area difference of each pixel area and a characteristic threshold.

17. The image processing device of claim 16, wherein the step of acquiring the pixel area difference of each pixel area according to the differences between pixels of each pixel area comprises:
    increasing the pixel area difference of a first pixel area when the first pixel of the first pixel area is different from a first horizontal pixel horizontally adjacent to the first pixel.

18. The image processing device of claim 16, wherein the step of acquiring the pixel area difference of each pixel area according to the differences between pixels of each pixel area comprises:
    increasing the pixel area difference of a first pixel area when a first pixel of the first pixel area is different from a first vertical pixel vertically adjacent to the first pixel.

19. The image processing device of claim 16, wherein the step of determining the plurality of characteristic pixels of each binary image according to the pixel area difference of each pixel area and the characteristic threshold comprises:
    determining a first pixel corresponding to a first pixel area is one of the plurality of characteristic pixels of each binary image when the pixel difference of the first pixel area exceeds the characteristic threshold.

20. The image processing device of claim 16, wherein the step of aligning the plurality of images according to the plurality of the characteristic pixels of each binary image comprises:
   aligning the plurality of images according to the plurality of pixel areas corresponding to the plurality of characteristic pixels.

* * * * *